United States Patent [19]
Huarng

[11] Patent Number: 5,846,474
[45] Date of Patent: Dec. 8, 1998

[54] THERMOPLASTIC POLYURETHANE WITH POLY(HYDROXYL GROUP)-CONTAINING RESIN

[75] Inventor: Roger Jyh-Chiarng Huarng, Northville, Mich.

[73] Assignee: BASF Corporation, Mt. Olive, N.J.

[21] Appl. No.: 824,582

[22] Filed: Mar. 26, 1997

Related U.S. Application Data

[60] Continuation of Ser. No. 429,447, Apr. 27, 1995, abandoned, which is a division of Ser. No. 148,443, Nov. 8, 1993, abandoned, which is a continuation-in-part of Ser. No. 993,560, Dec. 21, 1992, abandoned.

[51] Int. Cl.$^6$ ............................ B29C 45/72; B29C 45/73; C08L 75/04
[52] U.S. Cl. .................................. 264/328.14; 264/328.16; 525/123; 525/453; 525/454; 525/455; 525/456
[58] Field of Search ...................................... 525/455, 123, 525/453, 454, 456; 264/328.14, 328.16

[56] References Cited

U.S. PATENT DOCUMENTS 4,497,926  2/1985  Toy ........................................ 524/271

FOREIGN PATENT DOCUMENTS 61-283541  12/1986  Japan .
1-207372  8/1989  Japan .
3-261521  11/1991  Japan .

*Primary Examiner*—Robert E. Sellers
*Attorney, Agent, or Firm*—James J. Drake

[57] ABSTRACT

Injection-moldable thermoplastic polyurethane compositions with reduced cycle time contain a cycle time reducing amount of a low molecular weight, high softening point, poly(hydroxyl group)-containing resin, preferably a phenolic modified terpene resin.

1 Claim, No Drawings

5,846,474

THERMOPLASTIC POLYURETHANE WITH POLY(HYDROXYL GROUP)-CONTAINING RESIN

This is a continuation of application Ser. No. 08/429,447, filed Apr. 27, 1995, abandoned, which is a division of application Ser. No. 08/148,443, filed Nov. 8, 1993, abandoned, which is a continuation-in-part of application Ser. No. 07/993,560, filed Dec. 21, 1992, abandoned.

BACKGROUND OF THE INVENTION

1. Field of the Invention

The present invention pertains to thermoplastic polyurethanes. More particularly, the present invention pertains to thermoplastic polyurethanes exhibiting reduced cycle time in molding operations.

2. Description of the Related Art

Commercial applications of thermoplastic polyurethanes (TPU) continue to grow at a rapid pace. Unlike their thermoset relatives, TPU can be processed in a manner similar to other thermoplastics in operations such as extrusion, injection molding, wire coating, etc. Useful TPU for such operations usually have a hardness after molding ranging from 80 Shore A to 74 Shore D.

The productivity associated with injection-moldable thermoplastics depends to a great extent on the cycle time associated with the particular molding process. In general, the thermoplastic utilized must exhibit sufficient "green strength" to be demolded, to develop a level of properties sufficient to maintain shape and structural integrity upon demolding. The development of this "green strength" determines length of the solidification portion of the overall molding process.

To control the cycle time, numerous variables in the molding process may be adjusted, however in the final analysis, the amount the cycle time may ultimately be decreased is dependent on the physical properties desired of thermoplastic itself. In polyurethanes, for example, the properties of the TPU may be altered by varying the nature of the diol and diisocyanate which have been reacted to form the TPU. Such methods of varying TPU properties are by now well established in the art. Given a particular TPU, however, physical properties such as melting point, melt viscosity and other properties important to the molding process are fixed.

Addition of plasticizers to TPU may aid in increasing their tensile elongation and may also result in lower melting point and melt viscosity. However the use of plasticizers may also decrease the rate of crystallization, and thus the positive effect on cycle time expected due to lower processing temperatures and/or pressures is negated by the longer solidification time. Furthermore, tensile strength and modulus may be lowered by addition of plasticizer. Finally, plasticizer may bleed out of the finished product, particularly at high ambient temperatures.

Addition of crystallizing agents would be expected to decrease cycle time, and indeed this is frequently the case. However, many crystallization promoters prohibit the final article from being transparent or in many cases even translucent. Moreover, many of such crystallization promoters or nucleating agents decrease certain desirable physical properties such as low temperature impact resistance. Crystallizing agents which are small enough in size or are soluble in the TPU such that transparent articles may be obtained are expensive, and only limited amounts can be utilized.

It would be desirable to utilize an additive which when added to TPU would decrease cycle time without significantly decreasing physical properties such as hardness, tensile strength, modulus, and tensile elongation, or the use of which may actually increase such physical properties.

SUMMARY OF THE INVENTION

It has now been surprisingly discovered that addition prior to molding, of minor quantities of a low molecular weight, high softening point, poly(hydroxyl group)-containing resin to TPU decreases cycle time appreciably without significantly affecting physical properties. When the preferred resin is utilized, aged physical properties may actually increase, and the TPU product will have a hardness ranging from 80 Shore A to 74 Shore D.

DESCRIPTION OF THE PREFERRED EMBODIMENTS

The thermoplastic polyurethane utilized in the subject invention compositions is not critical. Thermoplastic polyurethanes are prepared by reacting a diol with a diisocyanate in approximately a 1:1 mole equivalent ratio. It may be advisable, in certain circumstances, to utilize a most minor portion of a triol to introduce a slight degree of crosslinking into the TPU. However, in general, diols and diisocyanates are used to the exclusion of triols or other monomers having a hydroxyl functionality greater than 2.

The diisocyanates utilized may be aliphatic, aromatic, cycloaliphatic, or mixtures of these isocyanates. Among the aliphatic and cycloaliphatic isocyanates are cyclohexane diisocyanate, hexamethylene diisocyanate, isophorone diisocyanate, and bis[1-isocyanato-1-methylethyl] benzene. Among the aromatic diisocyanates useful are 1,4-phenylenediisocyanate, 2,4- and 2,6-toluenediisocyanate and their mixtures, and 2,2'-, 2,4'-, and 4,4'-methylenediphenylene diisocyanates. The naphthalene diisocyanates may also be useful.

Among the diols useful are the simple substituted and unsubstituted aliphatic and cycloalphatic glycols such as ethylene glycol, diethylene glycol, propylene glycol, dipropylene glycol, 1,4-butanediol, 1,4-cyclohexanediol, 1,4-cyclohexanedimethanol, neopentyl glycol, and 2,2,4-trimethylpentane glycol; aromatic diols such as hydroquinone; polyoxyalkylene glycols such as polyoxyethylene and polyoxypropylene glycols, copolymer polyoxyethylene/polyoxypropylene glycols, polytetrahydrofurans, and other dihydroxyl functional polyethers.

Also suitable are hydroxyl functional polyester polyols. Such polyesters are prepared by reacting a slight excess of a glycol or other dihydroxyl functional compound with a dicarboxylic acid or derivative thereof, such as a diacid chloride lower alkanol diester, or anhydride. Suitable glycols include those listed previously as diol components for thermoplastic polyurethanes. Suitable dicarboxylic acids or their derivatives include aliphatic compounds such as adipic acid, azelaic acid, glutaric acid and the like as well as their anhydrides; aromatic acids such as phthalic acid, terephthalic acid, and their anhydrides; and mixtures of these various acids and anhydrides.

To prepare the thermoplastic polyurethane, standard modes of preparation well known to those skilled in the art are utilized. The reactants may, for example, be mixed, together with a urethane promoting catalyst such as an amine catalyst or tin catalyst, for example dibutyltindiacetate or dibutyltindilaurate, and heated on a traveling belt or in an extruder until the reaction is complete.

TPU may also be produced by reacting isocyanate terminated prepolymers with hydroxyl functional prepolymers. In addition to providing excellent control of the NCO/OH ratio, this mode of preparation allows for block copolymer TPU whose various blocks can be tailored for specific applications. Methods of preparing thermoplastic polyurethanes and compositions suitable therefor are disclosed in U.S. Pat. Nos. 4,526,952 and 4,129,611, which are herein incorporated by reference. The extrusion process for preparing thermoplastic polyurethanes is disclosed in U.S. Pat. No. 3,642,964, and TPU production is further disclosed in U.S. Pat. No. 3,284,539, both these patents herein incorporated by reference. Further information relative to TPU production may be found in PLASTICS 68, 1978, pages 819–825, and *The Plastics Handbook,* Vol. 7, *Polyurethanes,* 2d Ed., G. Oertel, Carl-Hanser Publisher, Munich, 1983. It is also possible to prepare TPU having selected physical properties by dry blending or melt blending TPU of different hardnesses.

The product TPU has exceptionally low free isocyanate content, less than 0.5 weight percent, and preferably less than 0.05 weight percent. TPU is an essentially reactive-group free product, and presence of any significant amount of reactive isocyanate groups is undesirable. The final product is then ground or granulated, or the extrudate chopped into short lengths. Master batches containing flame retardants, antioxidants, dyes or pigments, fillers, chopped reinforcing fibers or whiskers may be added prior to cure and granulation, or the granulate may be dry mixed with such additives and auxiliaries and used as such or remelted and regranulated.

The low molecular weight, high softening point polyhydroxy resin may be a novolac type resin, although such resins are often not preferred because of undesirable colors they impart to the thermpoplast polyurethane composition. Preferred low molecular weight, high softening point polyhydroxy resin and copolymer resins include polymers prepared from hydroxyl-containing vinyl monomers where the hydroxyl group does not participate in polymerization, for example copolymers of styrene and 4-hydroxystyrene, and poly(vinylphenol); reaction products of epoxy resins such as those based on bisphenol A or bisphenol F and additional bisphenol A or bisphenol F; and most preferably, resins based on the reactions of terpenes and phenols. Vinyl aromatic/terpene/phenol terpolymers, for example, are disclosed in U.S. Pat. No. 4,701,517 which is herein incorporated by reference. Terpene/phenol resins and their mode of preparation are discussed by J. J. Mattiello, *Protective and Decorative Coatings,* Vol. 1, John Wiley & Sons, Inc., 1941, pp. 568–573 and the patents referred to therein, these being herein incorporated by reference for the purpose of disclosing preparation of terpene/phenol resins. Also suitable are co- or terpolymer resins prepared from dicyclopentadiene and phenols, optionally in the presence of terpenes or other unsaturated monomers. Further suitable, are the condensation products of phenol-containing resins as previously described, with formaldehyde.

The low molecular weight, high softening point, poly (hydroxyl group)-containing resin should have a softening point of at least 80° C., preferably above 110° C., and most preferably from 110° C. to about 140° C. The weight average molecular weight of the resin is preferably below 5000 Daltons, more preferably less than 2000–3000 Daltons. Preferably, the phenol content of the resin is greater than 30 weight percent, more preferably greater than 40 weight percent, and most preferably about 50 weight percent based on the total resin weight. Preferred low molecular weight, high softening point poly(hydroxyl group)-containing resins are PICCOFYN® T135 and PICCOFYN® T125 phenolic modified terpene resins available from Hercules, Inc., Wilmington, Del. PICCOFYN® T125 resin is particularly preferred.

The low molecular weight, high softening point, polyhdroxyl group-containing resin must be compatible or at least substantially compatible with the thermoplastic polyurethane. Compatibility is most easily addressed by dissolving the requisite amount of resin and TPU in a mutual solvent and casting a film. A clear film generally indicates complete compatibility. A film with only slight haziness generally indicates partial compatibility. However, although these simple tests are highly useful for initial screening of potentially useful resins, the ultimate test is performed by blending the TPU and resin and injection molding, or "shooting" a test plaque or part. Incompatibility is indicated by a substantial decrease in physical properties or by delamination of the part.

The low molecular weight, high softening point, poly (hydroxyl group)-containing resin may be dry blended with the TPU following the latter's granulation; melt blended with the TPU following its preparation but before granulation; or blended or coextruded with previously granulated or otherwise prepared TPU or other thermoplastic polymeric carriers. The mode of incorporation is not critical, and other methods may suggest themselves by one skilled in the art. Crystallizing agents are often not needed in compositions according to the invention, and the crystalline content of the TPU composition should be 5–15% by weight.

Master batches containing TPU, the low molecular weight, high softening point, poly(hydroxyl group)-containing resin, and optionally other additives such as dyes, pigments, fillers, mold release agents, fibrous reinforcement, and the like, may be advantageously prepared. Such master batches should contain in excess of 5 weight percent of the low molecular weight, high softening point, poly(hydroxyl group)-containing resin, preferably above 20 weight percent, and most preferably 40 weight percent or more.

The final TPU product should contain an amount of the low molecular weight, high softening point, poly(hydroxyl group)-containing resin which is effective to lower the cycle time of molded TPU parts containing the resin additive as compared to otherwise similar compositions not containing the resin additive. It has been found, in the case of phenol group-containing polyhydroxyl resins, that higher phenol content resins are effective in lower amounts than resins with lower phenol group content. The amount of the resin additive should be sufficient to reduce the cycle time of the thermoplastic polyurethane composition in injection molding operations as compared to the same thermoplast polyurethane composition not including the poly(hydroxyl group)-containing resin, and is generally between 0.1 weight percent and 5.0 weight percent based on the weight of the total TPU composition, with from 0.5 to about 3 weight percent being preferable.

The thermoplastic polyurethane product is prepared by injecting into a mold at a temperature sufficient to render the composition injectable a composition comprising the thermoplastic polyurethane resin and the low molecular weight, high softening point, poly(hydroxyl group)-containing resin. The composition is then cooled for a time sufficient to develop sufficient green strength to be demolded, and removed from the mold.

The invention will now be illustrated by the following actual examples, which are not to be construed as limiting the scope of the invention in any way. Elastollan® S90A-50 thermoplastic polyurethane (hereinafter, TPU) was used in all examples.

EXAMPLES 1 and 1C

Molding trials were performed with unmodified TPU (Example 1C, Comparative) as well as with TPU whose granulate had been dry blended with 2 weight percent PICCOFYN® T125 phenolic modified terpene resin (Example 1). The mold consisted of a single cavity metal mold (4"×4") with adjustable thickness from 0.05" to 0.25". The molding machine was a Cincinnati 110-Ton injection molding machine. Significant process parameters and physical properties are given in Table 1.

EXAMPLES 2C and 2–4

Molding trials were performed as with the previous example, but with unmodified TPU (Example 2C), TPU modified by incorporation of a 2 weight percent (Example 2) and 4 weight percent (Example 3) TPU master batch granulate of TPU containing proprietary additives and PICCOFYN® T125 phenolic modified terpene resin in a weight ratio of 1:1; and TPU modified by incorporation of 2 weight percent of the master batch described above and 0.5 percent of a proprietary concentrate designed to lower the yellowness index of the finished part (Example 4). The results are presented also in Table 1.

TABLE 1

| Example | 1C | 1 | 2C | 2 | 3 | 4 |
|---|---|---|---|---|---|---|
| PICCOFYN ® T 125 | — | 2 | — | — | — | — |
| PICCOF ® Master Batch[1] | — | — | — | 2 | 4 | 2 |
| Yellowness Inhibitor | — | — | — | — | — | 0.5 |
| Front Temperature (°F.) | 430 | 425 | 430 | 430 | 425 | 430 |
| Nozzle Temp. (°F.) | 425 | 420 | 425 | 425 | 420 | 425 |
| Mold Temp. (°F.) | 90 | 95 | 87 | 87 | 87 | 89 |
| Back Pressure (psi) | 160 | 100 | 160 | 160 | 160 | 160 |
| Solidification Time (sec.) | 19 | 9 | 25 | 12 | 10 | 12 |
| Heat Aged Properties (120° C.) | | | | | | |
| Tensile strength (psi) | | | | | | |
| Initial | 7486 | 6614 | 5598 | 5154 | 5015 | 5099 |
| 14 Days | 4695 | 5610 | 5494 | 5299 | 4862 | 5177 |
| 300% Modulus (psi) | | | | | | |
| Initial | 2607 | 2637 | 2173 | 2140 | 1985 | 1999 |
| 14 Days | 1953 | 2108 | 2242 | 2221 | 2209 | 2169 |
| 100% Modulus (psi) | | | | | | |
| Initial | 1298 | 1309 | 1242 | 1264 | 1182 | 1295 |
| 14 Days | 1097 | 1107 | 1272 | 1274 | 1245 | 1361 |
| Tensile Elongation (%) | | | | | | |
| Initial | 675 | 623 | 568 | 565 | 591 | 615 |
| 14 Days | 673 | 704 | 698 | 69.0 | 643 | 696 |
| Yellowness Index (Ye) | | | | | | |
| Initial | 11.3 | 11.7 | 13.0 | 36.7 | 56.9 | 14.7 |
| 14 Days | 64.9 | 82.5 | 54.6 | 80.9 | 87.3 | 68.4 |

[1]Masterbatch containing TPU, additives, and 50 weight percent PICCOFYN ® T 125 phenolic modified terpene resin.

The Examples indicate that the addition of low molecular weight, high softening point poly(hydroxyl group)-containing resin to TPU in minor amounts, i.e. 1–2 weight percent, results in a significant (–50%) reduction in the "cure" or "solidification" time of the injection molded TPU part. Of course, the reduction in total cycle time, as reflected by the above cycle plus the injection time, pack time, hold time, and idle time is not as dramatic, but still results in an approximately 25–33% total cycle time reduction as measured under the test conditions.

What is claimed is:

1. A process for the preparation of a thermoplastic polyurethane injection-molded part having a hardness of at least 80 Shore A at 23° C., comprising the steps of:

(1) injecting into a mold a thermoplastic composition comprising, at a temperature sufficient to render said composition injectable:

(a) a thermoplastic polyurethane resin having a free isocyanate content of less than 0.5 weight percent; and (b) between 0.1 and 5.0 weight percent based on the weight of the total composition of a low molecular weight poly(hydroxyl group)-containing resin having a softening point of at least 80° C.

(2) cooling said composition for a time sufficient to develop sufficient green strength to be demolded, and (3) removing the molded composition from the mold, wherein the resulting injection molded part has a cycle time which is less than that of an injection molded part made of thermoplastic polyurethane resin (a) alone.

* * * * *